(12) United States Patent
Filippi et al.

(10) Patent No.: US 7,186,389 B2
(45) Date of Patent: *Mar. 6, 2007

(54) METHOD FOR CARRYING OUT CHEMICAL REACTIONS IN PSEUDO-ISOTHERMAL CONDITIONS

(75) Inventors: Ermanno Filippi, Castagnola (CH); Enrico Rizzi, Grandate (IT); Mirco Tarozzo, Ligornetto (CH)

(73) Assignee: Methanol Casale S.A. (CH)

( * ) Notice: Subject to any disclaimer, the term of this patent is extended or adjusted under 35 U.S.C. 154(b) by 57 days.

This patent is subject to a terminal disclaimer.

(21) Appl. No.: 10/648,894

(22) Filed: Aug. 27, 2003

(65) Prior Publication Data

US 2004/0091403 A1 May 13, 2004

(30) Foreign Application Priority Data

Aug. 27, 2002 (EP) .................................. 02019233

(51) Int. Cl.
*B01J 8/02* (2006.01)
*B01J 19/00* (2006.01)
*F28F 27/02* (2006.01)

(52) U.S. Cl. ...................... 422/200; 422/211; 422/198; 422/201; 165/157; 165/177; 165/178; 423/361

(58) Field of Classification Search ................ 422/200, 422/211, 198, 201; 165/157, 177, 178; 423/361
See application file for complete search history.

(56) References Cited

U.S. PATENT DOCUMENTS

| 2,384,858 A | 9/1945 | Thayer et al. |
| 5,520,891 A * | 5/1996 | Lee .............................. 422/200 |
| 6,299,849 B1 * | 10/2001 | Pagani et al. ................ 423/361 |

FOREIGN PATENT DOCUMENTS

| EP | 1 153 653 | * | 11/2001 |
| EP | 1 236 505 A1 | | 9/2002 |
| GB | 1088009 A | | 10/1967 |
| WO | WO-90/09234 A1 | | 8/1990 |

* cited by examiner

*Primary Examiner*—N. Bhat
(74) *Attorney, Agent, or Firm*—Akerman Senterfitt

(57) ABSTRACT

Method for carrying out in continuous, under so-called pseudo-isothermal conditions and in a predetermined reaction environment, such as a catalytic bed, a selected chemical reaction, comprising the steps of providing in the reaction environment at least one tubular heat exchanger fed with a first flow of a heat exchange operating fluid at a respective predetermined inlet temperature, the fluid passing through the at least one tubular heat exchanger according to a respective inlet/outlet path, which method also provides the step of feeding into the at least one tubular heat exchanger and at one or more intermediate positions of said path, a second flow of operating fluid having a respective predetermined inlet temperature.

10 Claims, 1 Drawing Sheet

METHOD FOR CARRYING OUT CHEMICAL REACTIONS IN PSEUDO-ISOTHERMAL CONDITIONS

DESCRIPTION

1. Field of Application

In its broader aspect, the present invention relates to a method for carrying out chemical reactions in pseudo-isothermal conditions, that is to say under conditions in which the reaction temperature is controlled in a narrow range of values around a predetermined optimum value.

In particular, this invention relates to a method of the above mentioned type for controlling the temperature of catalyzed reactions, based upon the use of heat exchangers immersed in the reaction environment, for example in a catalytic bed, in which a selected chemical reaction takes place.

Still more in particular, although not exclusively, the present invention relates to a method in which the reaction temperature control is obtained by using tubular exchangers immersed in a catalytic bed and internally passed through by a suitable heat exchange operating fluid.

The present invention also relates to a tubular heat exchanger having a suitable structure for carrying out the above-mentioned method.

2. Prior Art

As known, for exothermal or endothermic chemical reactions, such as the synthesis reactions of methanol, formaldehyde or styrene, to be satisfactorily completed, it is necessary to respectively remove or provide heat to the environment in which the reaction is taking place, so as to control its temperature in a narrow range around a predetermined theoretical value.

Likewise, it is known that for the above mentioned purpose, heat exchangers of the most various types are widely used, which are immersed in the reaction environment (usually a catalytic bed) and passed through internally by a suitable heat exchange operating fluid.

The pseudo-isothermal degree of the reaction, that is to say the degree of progress or completion of the reaction itself, depends on the way such heat exchangers are used, on their functionality, on the effectiveness with which the heat is provided to or removed from the reaction environment (thermal yield).

Although advantageous as far as some aspects thereof are concerned, the methods of the prior art, used so far to carry out chemical reactions in pseudo-isothermal conditions have a known drawback, which in the industry forms a limit to the degree of progress or completion of the reaction itself.

In fact, the operating fluid, which passes through a heat exchanger according to a predetermined inlet/outlet path, necessarily undergoes a substantial temperature variation by exchanging heat with the environment (for example a catalytic bed) in which said heat exchanger is arranged.

To such temperature variation of the operating fluid, that is substantially continuous along said path, unavoidably corresponds a continuous decrease of the operating effectiveness of the heat exchanger.

In fact, the heat exchange between the operating fluid and the reaction environment is not homogeneous along the walls of the heat exchanger, but tends to decrease there, where the temperature difference between the internal and external fluid decreases.

Accordingly, the pseudo-isothermal degree of the reaction conditions achieved by the methods and the exchangers of the prior art, is characterized by a reaction temperature, which is controlled in an always relatively wide range of values around the one corresponding to the isotherm, or the design temperature profile, of reference. To this situation is also associated a limited degree of completion of the considered chemical reaction.

SUMMARY OF THE INVENTION

The technical problem underlying the present invention is that of providing a method for carrying out chemical reactions in so called pseudo-isothermal conditions, based upon the use of tubular heat exchangers, which are active in the environment in which a predetermined reaction is carried out, and adapted to maintain a predetermined constant value of the reaction temperature or anyway to control said temperature in a very narrow range of values so as to substantially increase the degree of progress or completion of the reaction with respect to what has been possible so far with the methods of the prior art.

The idea for solving said problem is that of controlling the temperature of a heat exchange operating fluid at the aforesaid predetermined value as it passes through the respective tubular heat exchanger.

According to such idea, the above indicated technical problem is solved according to the invention by a method for carrying out in continuous under pseudo-isothermal conditions and in a predetermined reaction environment, such as a catalytic bed, a selected chemical reaction, comprising the steps of providing in said reaction environment at least one tubular heat exchanger fed with a first flow of a heat exchange operating fluid at a predetermined inlet temperature, said operating fluid passing through said at least one tubular heat exchanger according to a respective inlet/outlet path;

which method is characterized by:

feeding into said at least one tubular heat exchanger and at one or more intermediate positions of said path, a second flow of operating fluid having a respective predetermined inlet temperature.

By suitably selecting the inlet temperature of the second flow, the number of said intermediate positions and the position itself, wherein a mixing of said second flow with the fluid of said first flow takes place, it is possible to bring the temperature of the operating fluid to a design value, and by consequence, it is possible to control the temperature of the heat exchange operating fluid within a very narrow range of values around a predetermined value.

Moreover the invention relates to a tubular heat exchanger having structural and functional features adapted to carry out the aforesaid method.

The features and the advantages of a method according to the invention will become clearer from the following description of an indicative and non-limiting example of embodiment thereof, made with reference to the attached drawing.

DETAILED DESCRIPTION OF THE DRAWINGS

Figure 1:
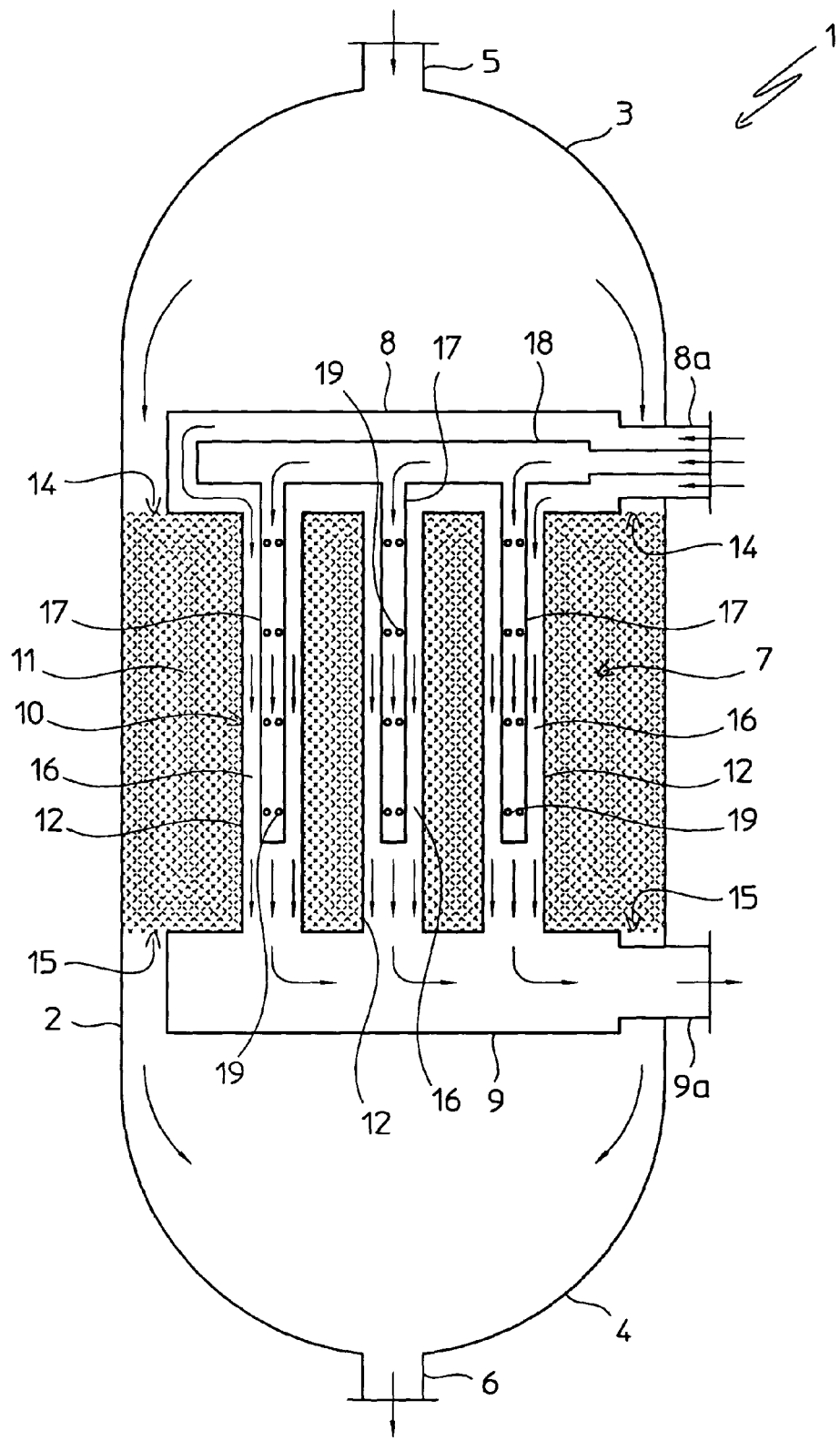
FIG. 1 shows schematically a view in longitudinal section of a chemical reactor comprising a tubular heat exchange unit that can be used for carrying out the method according to the present invention.

With reference to the aforesaid figure, with 1 is indicated—as a whole—a pseudo-isothermal reactor comprising a cylindrical shell 2, with a vertical axis, closed at the opposite ends by an upper 3 and a lower 4 bottom, respectively. The bottoms 3, 4 are equipped with passages 5 and 6 for the introduction of reactants and the discharge of reaction products, in and from said pseudo-isothermal reactor 1.

In the shell 2 is defined a reaction zone or environment 7, such as a catalytic bed, comprised between an upper distributor duct 8 for the feeding/distribution of an operating fluid in a tubular heat exchange unit 10 according to the present invention that will be described in more details in the following of the description, and a lower collector duct 9, for the collection and discharge of said fluid.

The distributor duct 8 passes through the shell 2, to be connected, outside of it, to a source, not shown of said operating fluid (e.g. consisting of cooling gas, boiling water, or melted salts and the like).

The collector tube 9, in the same way as the distributor duct 8, crosses the shell 2, to be connected to different applications outside the reactor 1.

The engagement of the ducts 8 and 9 through the shell 2 is obtained through suitable nozzles 8a and 9a, respectively.

The reaction zone 7 is intended to contain a mass of an appropriate catalyst 11, in which a plurality of tubular heat exchangers—all indicated with 12—of unit 10 are immersed and supported. The mass of appropriate catalyst 11 is conventionally supported in the reaction zone 7 by an appropriate mass of granulated inert material (not shown).

Between ducts 8 and 9 and an internal wall of the shell 2, respective passages 14, 15 are also defined for the inlet of the reactants and the outlet of the reaction products, respectively, in and from said reaction zone 7.

Said tubular heat exchange unit 10 has a generally cylindrical shape, with an outer diameter slightly lower of the inner diameter of the shell 2.

In particular, according to a preferred but not limiting embodiment shown in FIG. 1, said unit 10 comprises a plurality of tubular heat exchangers 12, regularly distributed and immersed in the catalyst mass of the reaction zone 7. Each exchanger 12 is made of a rectilinear tube substantially parallel to the vertical axis of the shell 2 and connected at one end thereof with said distributor duct 8 and at its opposed end with said collector duct 9.

Still more in particular, the tubular exchangers 12 define at their internal a chamber 16 for the flowing of the heat exchange operating fluid from said distributor duct 8 to said collector duct 9.

Advantageously, according to the present invention, the tubular exchangers 12 comprise an additional distributor 17 of the heat exchange operating fluid in fluid communication with the chamber 16 and a feeding duct 18 of said operating fluid in fluid communication with said additional distributor 17.

As shown in the example of FIG. 1, the additional distributor 17 is made of a tubular element coaxially arranged within the chamber 16 and extending for substantially the entire length of the tubular exchanger 12. The additional distributor 17 is closed at its lower end while it is in fluid communication with the feeding duct 18 at its upper end.

In particular, the additional distributor 17 comprises five (horizontal) rows of holes 19. Each row of holes is in fluid communication with the chamber 16 at a respective predetermined distance between the upper distributor duct 8 and the lower collector duct 9.

The feeding duct 18 is preferably arranged within the distributor duct 8 and passes through the shell 2—via nozzles 8a—to be connected, outside of it, to a source, not shown of said operating fluid (e.g. consisting of cooling gas, boiling water, or melted salts and the like), preferably the same as that of the distributor duct 8.

According to the method of the present invention, in order to control the temperature of a chemical reaction, for instance the strongly exothermal synthesis of methanol, a plurality of heat exchangers 12 of the above described type—forming a heat exchange unit 10—is suitably arranged in the environment where said reaction has to take place in continuous, such as the reaction zone 7.

Each of said exchanger 12 is connected on one side to a source (not shown) of heat exchange operating fluid, through a fluid inlet distributor duct 8, and on the other side to a discharge manifold (not shown), through the respective fluid collector duct 9.

The additional distributor 17 of each heat exchanger 12 is in turn connected to said operating fluid source through the feeding duct 18.

Once this preliminary step has been carried out, the selected chemical reaction can be started.

During the reaction, the heat generated or absorbed therefrom is at least partially removed or provided to the reaction environment, respectively, through the plurality of exchangers 12. The exchangers 12 put in heat exchange relationship said environment with a first flow of operating fluid fed into each of said exchangers through the distributor duct 8.

The flow rate of said first flow, as well as the temperature of said operating fluid, are computed in advance, in a per se known way, according to the chemical and kinetic characteristics of the specific reaction, taking into account that the heat exchange "yield" (and hence the reaction progress degree) is also a function of the difference of temperature existing between the reaction environment and the operating fluid.

At the area of said exchangers 12, which are closer to the distributor duct 8, where said temperature difference is at its maximum, we can find the maximum heat exchange yield. However, just because of said heat exchange, the temperature of the operating fluid varies as it flows away from the distributor duct 8, in its path through the exchangers 12, thus tending to match up the temperature of the reaction environment.

In order to avoid that, due to the above variation, the temperature of the operating fluid "falls out" from a predetermined range of values, which is desirably narrow around a value computed in advance, according to the present invention a second flow of operating fluid is fed into each exchanger 12, through the feeding duct 18 and the additional distributor 17, respectively.

Of course, the fluid temperature of this second flow is selected in such a way that, when mixing the two flows inside the exchangers 12 at the position of the additional distributor holes 19, the same will be as close as possible to the inlet temperature of the first flow.

With the method of the present invention, with a suitable selection of the temperature of the second flow and of the number of rows of holes 19 and their position along the additional distributor 17 within each exchanger 12, it is thus possible to control the temperature of the heat exchange operating fluid within a predetermined range of values during its path through a heat exchanger.

Given the tight correlation between the temperature of the reaction environment and that of the heat exchange fluid, which operates in such environment, it is likewise possible to control the temperature of the reaction environment, which substantially corresponds to the temperature of reaction.

A further advantage resulting from the present invention is provided by the possibility of controlling the heat exchange coefficient between the operating fluid flowing in a heat exchanger and a reaction fluid flowing in the reaction environment.

In fact, by feeding the second flow of operating fluid into the heat exchanger through a separated distributor (17), it is possible to vary in an independent way the flow rate and velocity of such second flow and thus to suitably control the flow rate and velocity of the operating fluid inside the heat exchanger.

As these parameters directly influence the heat exchange coefficient, that is to say: the higher is the flow rate and velocity of the operating fluid, the higher is the heat exchange coefficient, and vice versa, thanks to the present invention it is thus possible to obtain the desired heat exchange along the entire heat exchanger, thus being able to control optimally the progress of the chemical reaction.

The so conceived invention is subject to variations and changes, all falling within the scope of protection defined by the following claims.

For example, according to a not shown alternative embodiment of the present invention, the number of holes 19 in a row and/or the their diameter can vary from row to row so as to appropriately change the flow rate and velocity of the second flow of operating fluid fed into the chamber 16 of a heat exchanger 12. In this way it is possible to better control the heat exchange coefficient between the operating fluid flowing in the heat exchanger and a reaction fluid flowing in the reaction environment.

The velocity of the operating fluid flowing within the heat exchanger 12, and thus the heat exchange coefficient, can be controlled also by varying the diameter of the additional distributor 17 along its length and/or by varying its length with respect to that of the heat exchanger 12 and/or by changing the diameter of the heat exchanger 12 along its length.

Also the number of rows of holes 19 along the additional distributor 17 can vary depending on the specific application and the desired temperature control as well as on the length of the additional distributor 17, itself. There can be conditions where a single row of holes 19 is sufficient or where the number must be much more than five. Furthermore, in certain circumstances it can be preferable to have a single hole 19 instead of a row of holes.

According to a further embodiment, not shown, of the present invention, the feeding duct 18 can be arranged within the collector duct 9 and made to pass through the shell 2—via nozzles 9a—to be connected, outside of it, to the source of operating fluid. In this case, the additional distributor 17 is connected to the feeding duct 18 at its lower end while it is closed at the top.

The invention claimed is:

1. A method for carrying out in continuous, under pseudo-isothermal conditions and in a predetermined reaction environment, a selected chemical reaction, comprising the steps of:
    feeding a first flow of a heat exchange operating fluid at a respective predetermined inlet temperature in at least one tubular heat exchanger provided in said reaction environment, said fluid passing through said at least one tubular heat exchanger according to a respective inlet/outlet path, and
    feeding into said at least one tubular heat exchanger and at one or more intermediate positions of said path, a second flow of operating fluid having a respective predetermined inlet temperature.

2. A heat exchanger comprising:
    a tubular element,
    a chamber defined within said tubular element for being passed through by a first flow of a heat exchange operating fluid,
    a fluid distributor duct, and
    a fluid collector duct connected to said tubular element and in fluid communication with said chamber,
    an additional distributor of a second flow of said operating fluid in fluid communication with said chamber, and
    a feeding duct of said second flow of operating fluid in fluid communication with said additional distributor.

3. The heat exchanger according to claim 2, wherein said additional distributor is supported within said tubular element and is provided with a least a hole in fluid communication with said chamber at a predetermined distance between said fluid distributor duct and said fluid collector duct.

4. The heat exchanger according to claim 3, wherein said additional distributor is tubular shaped, closed at one end thereof and connected to said feeding duct at an opposite end thereof.

5. The heat exchanger according to claim 4, wherein said feeding duct is supported within said fluid distributor duct or said fluid collector duct.

6. The heat exchanger according to claim 3, wherein said additional distributor extends for substantially the entire length of said tubular exchanger.

7. The heat exchanger according to claim 3, wherein said additional distributor is provided with a plurality of said holes arranged in rows at respective predetermined distances between said fluid distributor duct and said fluid collector duct.

8. The heat exchanger according to claim 4, wherein the diameter of said additional distributor varies along its length.

9. The heat exchange unit for pseudo-isothermal reactors, comprising at least one tubular heat exchanger according to claim 2.

10. A pseudo-isothermal chemical reactor comprising a catalytic bed and a heat exchange unit according to claim 9 provided therein.

* * * * *